Apr. 10, 1923.
P. MENDEZ
FOOD PREPARING UTENSIL
Filed Oct. 7, 1922
1,451,342
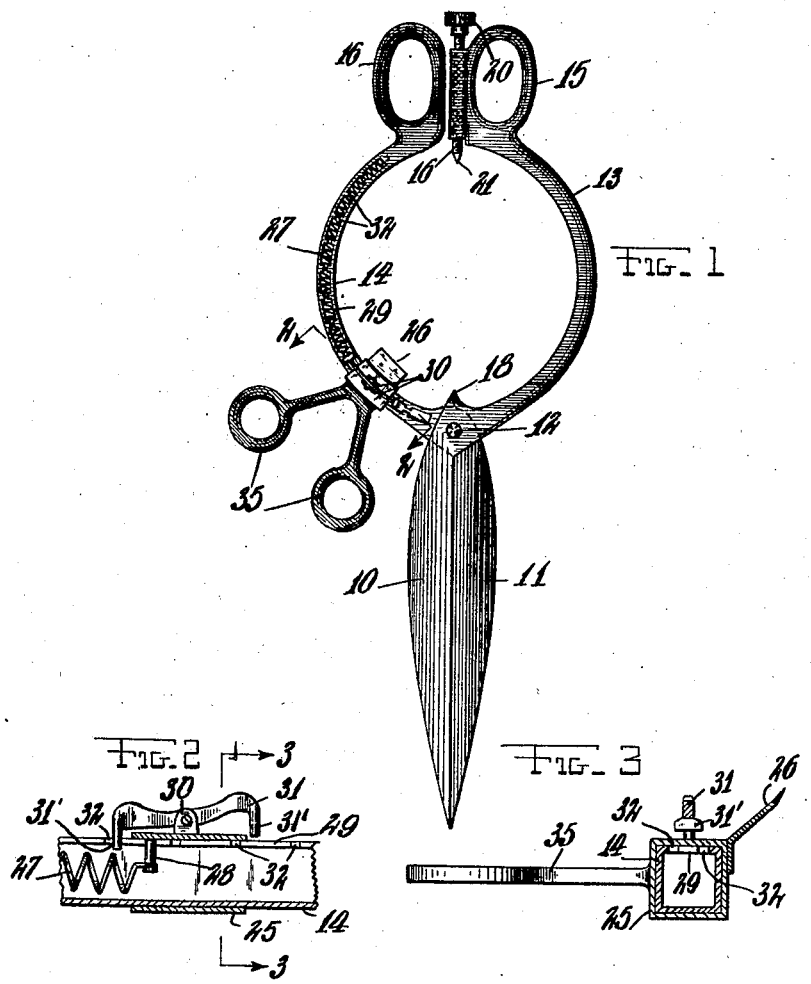
Inventor
Presiliano Mendez Patented Apr. 10, 1923.

1,451,342

UNITED STATES PATENT OFFICE.

PRESILIANO MENDEZ, OF VALMY, NEVADA.

FOOD-PREPARING UTENSIL.

Application filed October 7, 1922. Serial No. 593,040.

*To all whom it may concern:*

Be it known that I, PRESILIANO MENDEZ, a citizen of the Republic of Mexico, residing at Valmy, in the county of Humboldt and State of Nevada, have invented certain new and useful Improvements in Food-Preparing Utensils, of which the following is a specification.

This invention relates generally to utensils used in the preparation of food, having more particular reference to a device for use in slicing and peeling fruits or vegetables, the invention having for an object the provision of a novel and efficient device of this kind which may be constructed at small cost.

For further comprehension of the invention, and of the objects and advantages thereof, reference will be had to the following description and accompanying drawings, and to the appended claims in which the various novel features of the invention are more particularly set forth.

Fig. 1 of the drawings is a face view of my improved utensil.

Fig. 2 is a detail sectional view taken approximately along the line 2—2 of Fig. 1 and illustrating the means for shifting the peeling knife.

Fig. 3 is a transverse sectional view of this means, this view being taken along the line 3—3 of Fig. 2.

As here embodied my improved utensil comprises a pair of shear blades 10, 11 pivoted together as at 12 and provided with handles 13 and 14 respectively, these handles being curved to generally semi-circular shape and having finger grips 15, 16 on their ends. Formed on the handle 13 near its pivot point, is a rearwardly extending pointed lug 18, while a screw 19 is threaded through one side of the finger grip 15 in alinement with said point, this screw having a knurled head 20 for adjustment purposes, and a pointed inner end 21 adapted to cooperate with the lug 18 in supporting the article to be peeled.

Slidable along the handle 14 is a sleeve 25 having fixed to its inwardly facing side an inclined knife-blade 26 which is adapted for peeling fruit or vegetables. The handle 14 is hollow as shown and accommodates a coiled tension spring 27 one end of which is fixed to the handle near the finger grip 16, while the other end is attached to a pin 28 fixed to the sleeve and extending into the handle 14 through a longitudinal slot 29 in the latter.

Formed on the top of the sleeve 25, midway of its length, are a pair of ears 30, and to these ears a double armed locking dog 31 is pivoted. The widened ends 31' of this dog 31 are adapted to be engaged with lugs 32 projecting inwardly from the sides of the slot 29 and spaced therealong preferably double the distance it is desired to move the knife 26 each time it has taken a strip of peeling from the article being peeled. The length of the dog 31 is so proportioned with respect to the spacing of the lugs 32 as to cause one end to lie midway between, longitudinally considered, two pairs of lugs when the other end is engaged with another pair.

In the use of the device the shear blades 10, 11 may be used for slicing or cutting fruit or vegetables. To use the device in peeling, the screw 19 is driven back and the article to be peeled is placed with one side in engagement with the pointed lug 18 and the screw 19 is then moved forward until its pointed end 21 engages with the other side of the article, thus rotatively supporting the same.

The sleeve 25 is then slid along the handle 14, toward its pivoted end, and locked thereto by depressing one end of the dog 31. The two handles are then pressed together with one hand until the knife 26 engages the article which is then rotated with the other hand. After a strip of peeling has been removed the dog 31 is reversed, the spring 27 advancing the knife, and a second strip of peeling is removed by rotating the article, these operations being repeated as often as necessary.

The dog 31 preferably has sufficient frictional engagement with the ears 30 to remain in whatever position it may be adjusted to, and I may provide the sleeve 25 with handles 35, whereby it may be moved along the handle, the dog being adjusted to neutral position with both ends disengaged.

Having thus described my invention what I claim as new and desire to protect by Letters Patent of the United States is as follows:

1. A device of the class described comprising a pair of handles pivoted together, means on one handle for rotatively supporting an article to be peeled, and a knife slidably mounted on the second handle.

2. A device of the class described comprising a pair of handles pivoted together, means on one handle for rotatively supporting an article to be peeled, and a knife slidably mounted on the second handle, said handles being of approximately semi-circular shape.

3. A device of the class described comprising a pair of handles pivoted together, means on one handle for rotatively supporting an article to be peeled, and a knife slidably mounted on the second handle, a spring urging said knife along said handle, and means for locking said knife at fixed points on said handle.

4. A device of the class described comprising a pair of handles pivoted together, means on one handle for rotatively supporting an article to be peeled, and a knife slidably mounted on the second handle, a spring urging said knife along said handle, and means for locking said knife at fixed points on said handle, said means comprising a double ended pawl adapted to engage stop lugs on the handle.

5. A device of the class described comprising a pair of handles curved to semi-circular shape and pivoted together at one end, one of said handles being hollow, a sleeve slidable along said hollow handle, a knife-blade fixed to said sleeve, a coiled tension spring in said hollow handle connected at one end thereto, a pin fixed to said sleeve and projecting through a longitudinal slot in said hollow handle and having the other end of said tension spring connected thereto, a double ended dog pivoted to said sleeve, lugs on the walls of said slot adapted to be engaged by said dog, and means on the other handle for rotatively supporting an article to be peeled.

6. A device of the class described comprising a pair of handles curved to semi-circular shape and pivoted together at one end, one of said handles being hollow, a sleeve slidable along said hollow handle, a knife-blade fixed to said sleeve, a coiled tension spring in said hollow handle connected at one end thereto, a pin fixed to said sleeve and projecting through a longitudinal slot in said hollow handle and having the other end of said tension spring connected thereto, a double ended dog pivoted to said sleeve, lugs on the walls of said slot adapted to be engaged by said dog, and means on the other handle for rotatively supporting an article to be peeled, said means comprising a pointed lug and an alined screw.

In testimony whereof I have affixed my signature.

PRESILIANO MENDEZ.